Patented May 20, 1930

1,759,536

UNITED STATES PATENT OFFICE

ARNOLD K. BALLS, OF PHILADELPHIA, PENNSYLVANIA, ASSIGNOR OF ONE-THIRD TO MARTIN NILSSON, OF PEEKSKILL, NEW YORK, AND ONE-THIRD TO ARTHUR W. HIXSON, OF LEONIA, NEW JERSEY; THE NATIONAL CITY BANK OF NEW YORK EXECUTOR OF SAID MARTIN NILSSON, DECEASED

METHOD OF MANUFACTURING YEAST

No Drawing. Application filed December 24, 1925. Serial No. 77,592.

This invention relates to methods of manufacturing yeast.

In mashes for yeast growth, there are two distinct periods, the one of increasing acidity and the one of decreasing acidity. The optimum for yeast growth is less than the maximum of the first period and greater than the minimum of the second period.

An object of the present invention is to decrease the acid formed during the first phase and more nearly approach the optimum.

A further object of the invention is to decrease the base formed in the second phase and thus more nearly approach the optimum.

A further object of the invention is to assist in the obtaining of these results by decreasing the amount of material present in the mash which is capable of forming either bases or acids during the growth, thus rendering easier the subsequent control of the base and acid formed because of the total quantity being lessened and the buffer action of the ordinary mash therefore more effective.

The control of mash acidity is a desideratum in the industry because of the increased yields of yeast thus obtained. By means of the present invention, this desired result is obtained without the addition of alkalis or acids to the mash and therefore without the disadvantages attendant upon adding such energetic compounds to the yeast.

By decreasing the amount of material present in the mash which is capable of forming either bases or acids during the growth, the subsequent control of the mash is rendered easier. This is accomplished by removing the source of nitrogen from the category of acid or base producing substances, leaving only the sugar present as a potential source of acid or base. I have found that if the diamede of carbonic acid (carbamid) is employed as the source of nitrogen, it answers these requirements. This substance is neutral and is decomposed by yeast with assimilation of the amino groups and liberation of carbon dioxid which is removed by the air current. Neither alkali or acid are left in the mash from this source.

With a mash having a neutral source of nitrogen as above set forth or any other mash, the yield of yeast may be further increased by decreasing the acid formed in the first phase. This may be accomplished by introducing small quantities of a neutral salt of a yeast assimilable acid and a substantially non-assimilable base. As examples, neutral calcium, magnesium, potassium or sodium salts of any assimilable organic acid which is capable of furnishing the yeast with carbon may be employed. I prefer to employ a calcium salt and a salt of tartaric, lactic, succinic, malic, or pyruvic acid may be employed. Because of its relative cheapness, lactic acid is preferable, but advances in methods of producing some of the other salts may permit the use of such salts in place of calcium lactate.

In the third step of the invention which consists in decreasing the base formed in the second phase of the yeast growth by the introduction of a neutral salt of a substantially non-assimilable acid and a yeast assimilable base, I prefer to employ ammonium salts, such as ammonium chlorid or mixtures of ammonium chlorid, and ammonium sulfate. I am aware that ammonium salts have heretofore been employed in yeast growth as the source of nitrogen. It will be noted, however, that in the former case, the materials are added somewhere near the beginning of the yeast growth whereas in the present process, they are added near the end.

The addition of ammonium salts in sufficient quantity to supply the necessary nitrogen for the yeast growth when the mash is young will completely defeat the purpose of the present process. It is known that the inorganic acid radicals so introduced increase the acidity of the mash but for some unknown reasons, there is a reaction on the part of the yeast to this condition which greatly increases the production of alkali later on. This is the reverse of the conditions desired in the present process. Heretofore, it has been the aim to neutralize or remove the acids produced from the ammonium salts whereas I intend to utilize them in the process.

The quantity of materials used and the precise time and method of their additions to the mash will vary with the source of sugar, the dilution, the yeast culture employed, the speed at which it is designed to grow the yeast and the like. One set of conditions cannot be given for all of these variables. The acidity must always be greater than pH=7.0, otherwise a different type of sugar fermentation, unfavorable to yeast, will occur.

In a typical embodiment of the invention and as an illustration, a beet molasses mash of 3.5° Balling was fermented for 10 hours at 28° C., with vigorous aeration. Carbamid, ammonium acid phosphate and seed yeast were all added at the start. The proportions of these ingredients were 1.75 pounds, 2.0 pounds and 10 pounds respectively per 100 pounds of molasses used. The initial hydrogen ion condition of the mash was pH=5.3 and the acid was maintained between pH=4.3 and 5 for the first 7 hours by the addition of calcium lactate. The calcium lactate was added to the mash at the rate of ¼ pound per 100 pounds of molasses on six occasions at the end of the 1st, 3rd, 4th, 5th, 6th and 7th hours. The acid then had a tendency to drop but was maintained at a pH between 4.5 and 4.8 by four half hourly additions of ammonium chlorid and ammonium sulfate. The mixture of ammonium salts was added to the mash at half hour intervals starting at 7½ hours in the proportion of 0.05 pounds of ammonium chlorid and 0.06 pounds of ammonium sulfate per 100 pounds of molasses.

As stated, addition of the neutral salt of a yeast assimilable acid and a non-assimilable base during the period of increasing acidity and the addition of a neutral salt of a non-assimilable acid and an assimilable base during the period of decreasing acidity tends to maintain the acidity of the solution nearer to the desired optimum during the entire period of yeast growth and thus results in a more efficient yield.

While I have described in detail the preferred practice of my process, it is to be understood that the details of procedure, and proportions of ingredients may be widely varied and that known chemical equivalents may be employed in place of the materials mentioned, without departing from the spirit of the invention or the scope of the subjoined claims.

I claim:

1. In a process of manufacturing yeast by propagation in a mash containing a yeast-fermentable carbohydrate and phosphate ions, the improvement which comprises controlling the hydrogen-ion concentration of the mash by supplying yeast available nitrogen in the mash in the form of carbamide and by periodically adding to the mash a salt of an acid substantially assimilable by yeast and a base relatively non-assimilable by yeast.

2. In a process of manufacturing yeast by propagation in a mash containing a yeast-fermentable carbohydrate and phosphate ions, the improvement which comprises controlling the hydrogen-ion concentration of the mash by supplying yeast available nitrogen in the mash in the form of carbamide and by periodically adding to the mash a salt of an acid substantially assimilable by yeast and a base relatively non-assimilable by yeast, and thereafter periodically adding to the mash a salt of a base substantially assimilable by yeast and an acid relatively non-assimilable by yeast.

3. In a process of manufacturing yeast by propagation in a mash containing a yeast fermentable carbohydrate and phosphate ions, the improvement which comprises controlling the hydrogen ion concentration of the mash by supplying yeast available nitrogen in the mash in the form of carbamide and periodically adding calcium lactate to the mash.

4. In a process of manufacturing yeast by propagation in a mash containing a yeast fermentable carbohydrate and phosphate ions, the improvement which comprises controlling the hydrogen ion concentration of the mash by supplying yeast available nitrogen in the mash in the form of carbamide and periodically adding calcium lactate to the mash and thereafter periodically adding ammonium sulfate to the mash.

5. In a process of manufacturing yeast by propagation in a mash containing a yeast fermentable carbohydrate and phosphate ions, the improvement which comprises controlling the hydrogen ion concentration of the mash by supplying yeast available nitrogen in the mash in the form or carbamide and periodically adding calcium lactate to the mash, and thereafter periodically adding ammonium sulfate and ammonium chloride to the mash.

6. In a process of manufacturing yeast by propagation in a mash containing a yeast fermentable carbohydrate and phosphate ions, the improvement which comprises controlling the hydrogen-ion concentration of the mash by supplying yeast available nitrogen in the mash in the form of a substantially neutral material which is adapted to supply yeast assimilable nitrogen and which during the assimilation of the nitrogen by yeast has no material effect on the hydrogen-ion concentration of the mash, and adding a salt of an acid assimilable by yeast and a base relatively non-assimilable by yeast during the period of increasing acidity of the mash, and thereafter adding a salt of a yeast-assimilable base and an acid relatively non-assimilable by yeast during the period of decreasing acidity of the mash.

In testimony whereof, I affix my signature.

ARNOLD K. BALLS.